United States Patent [19]

Blumrich et al.

[11] 4,276,116

[45] Jun. 30, 1981

[54] PROCESS OF STRENGTHENING DILUTE PHOSPHORIC ACID

[75] Inventors: Walter Blumrich, Frankfurt am Main; Karl H. Dörr, Mainz; Hans J. König, Frankfurt am Main; Ulrich Sander, Friedrichsdorf, all of Fed. Rep. of Germany

[73] Assignee: Metallgesellschaft Aktiengesellschaft, Frankfurt am Main, Fed. Rep. of Germany

[21] Appl. No.: 41,468

[22] Filed: May 22, 1979

[30] Foreign Application Priority Data

Jun. 1, 1978 [DE] Fed. Rep. of Germany ....... 2824010

[51] Int. Cl.³ .............................................. B01D 1/28
[52] U.S. Cl. ............................... 159/47 R; 159/24 A; 159/DIG. 16; 159/DIG. 8; 423/321 R; 423/531
[58] Field of Search ................ 159/DIG. 8, DIG. 16, 159/24 A, 24 R, 47 R; 203/22, 25, DIG. 8, 23; 423/531, 532-538, 321 R

[56] References Cited

U.S. PATENT DOCUMENTS

| | | | |
|---|---|---|---|
| 3,203,875 | 8/1965 | Sturtevant | 159/24 A |
| 3,362,457 | 1/1968 | Chirico | 159/DIG. 16 |
| 3,620,673 | 3/1968 | Browder, Jr. | 423/532 |
| 3,675,707 | 7/1972 | Andersson et al. | 159/DIG. 16 |
| 4,010,246 | 3/1977 | Steinrotter et al. | 423/531 |

OTHER PUBLICATIONS

Phosphoric Acid, A. V. Slack, vol. 1, Part II, pp. 607-634, 1968, Marcel Dekker, Inc., publishers.

*Primary Examiner*—Norman Yudkoff
*Attorney, Agent, or Firm*—Sprung, Felfe, Horn, Lynch & Kramer

[57] ABSTRACT

A process for the concentration of dilute phosphoric acid in a phosphoric acid process characterized by a plurality of separate phosphoric acid cycles when the phosphoric acid is concentrated in each cycle by a vacuum evaporation is described wherein the phosphoric acid cycles is heated by indirect heat exchange by heat of formation formed in a sulfuric acid contact process.

4 Claims, 2 Drawing Figures

PROCESS OF STRENGTHENING DILUTE PHOSPHORIC ACID

BACKGROUND OF THE INVENTION

1. Field of the Invention

This invention relates to a process of concentrating dilute phosphoric acid, which is conducted in a plurality of separate phosphoric acid cycles, which are associated with respective vacuum evaporator stages connected in series, and is indirectly heated in each cycle outside the evaporators by means of surplus heat from a contact process sulfuric acid plant.

2. Discussion of the Prior Art

The treatment of raw phosphates with sulfuric acid often results in a dilute phosphoric acid which contains about 26 to 32% $P_2O_5$ which for use in the production of fertilizer, must be concentrated to a concentration of more than about 45% $P_2O_5$.

From A.V. Slack "Phosphoric Acid", Vol. 1, Part II, 1968, published by Marcel Dekker, Inc., New York, pages 607 to 634, it is known to concentrate phosphoric acid in a process in which the phosphoric acid is conducted in a plurality of separate phosphoric acid cycles, which are associated with respective vacuum evaporator stages connected in series, and is indirectly heated in each cycle outside the evaporators by means of low-pressure steam, which is produced by means of surplus heat from a sulfuric acid process contact process. Because much energy is consumed in concentrating phosphoric acid, a large proportion of the high-grade energy produced in the form of steam in the sulfuric acid contact process plant is spent for such concentrating. Unless it was required in the form of valuable steam for concentrating the phosphoric acid, the energy supplied from the sulfuric acid contact process plant could be used to produce more-electric power to meet the total energy requirement of the combined plant for producing sulfuric acid and phosphoric acid.

It is an object of the invention to provide a process for concentrating phosphoric acid in a combined plant for producing sulfuric acid and phosphoric acid which avoids, as far as possible, the use of high-grade energy for concentrating the dilute phosphoric acid and provides a substitute for such energy in a manner which is technologically simple and economical.

SUMMARY OF THE INVENTION

In accordance with the invention, this object is accomplished in that the phosphoric acid in the phosphoric acid cycles is indirectly heated by means of surplus heat which becomes available in the sulfuric acid in the $SO_3$ absorption systems of the contact process sulfuric acid plant and is to be dissipated.

The $SO_3$ formed in the contact process sulfuric acid plant is absorbed by concentrated sulfuric acid, which is circulated. In most cases, the absorption is effected in an interstage absorber and an end absorber. Owing to the heat generated by the exothermic reaction and the sensitive heat taken up from the gas phase, the acids leaving the absorbers are at temperatures of about 80 to 100°C. and where hot absorption systems are employed, at temperatures of about 200°C. To dissipate the heat which has been generated, the sulfuric acid must be cooled as it is circulated. As a result, thermal energy becomes available at relatively low temperatures and is usually not utilized. Dilute phosphoric acid is strengthened in two or more vacuum evaporator stages. In each stage, the phosphoric acid is circulated and phosphoric acid is supplied from each stage to the next only at the $P_2O_5$ rate of the phosphoric acid which enters the stage. In the phosphoric acid cycle associated with each evaporator stage, the phosphoric acid is passed through at least one heat exchanger and is heated therein by means of the heat which is to be dissipated from the sulfuric acid in the absorption systems. Part of the solids which have settled in the last evaporator stage may be withdrawn and recycled to the phosphoric acid cycle associated with the first stage so that deposition problems, particularly in the heat exchangers, will be avoided. In the vacuum evaporator stages, the phosphoric acid is concentrated in that water is evaporated in dependence on the water vapor partial pressure under the prevailing conditions of temperature, pressure and phosphoric acid concentration. In addition to water, most of the fluorine-containing compounds are driven off whereas the phosphoric acid vapor partial pressure is very low.

In one embodiment, the phosphoric acid in the phosphoric acid cycles is heated by an indirect heat exchange between the phosphoric acid and the sulfuric acid in the sulfuric acid cycles of the $SO_3$ absorption systems.

In that case, the sulfuric acid withdrawn from the absorpting systems is fed direct to the heat exchangers and in the latter indirectly transfers its heat to the phosphoric acid. That embodiment will be used mainly in new plants and where the conduits from the absorption systems to the heat exchangers of the phosphoric acid cycles are relatively short.

In another embodiment, the phosphoric acid in the phosphoric acid cycles is heated by a heat-carrying liquid medium, which is conducted in a closed cycle and heated by an indirect heat exchange with the sulfuric acid of the sulfuric acid cycles of the $SO_3$ absorption system. In that case the sulfuric acid withdrawn from the absorption systems is fed to heat exchangers which are disposed near the absorption systems and in which the heat-carrying medium consisting preferably of water under pressure is heated. Said heat-carrying medium is subsequently supplied to the heat exchangers of the phosphoric acid cycles. One closed cycle for the heat-carrying medium or a plurality of such cycles may be used. This embodiment will be used mainly where existing plants comprising heat exchangers in the absorption systems and in the phosphoric acid cycles are to be altered and where the conduits between the absorption systems and the heat exchangers of the phosphoric acid cycles are relatively long. The large total floor space required for the heat exchangers can be compensated to a large extent by the use of less expensive materials.

In a preferred embodiment, the phosphoric acid in the phosphoric acid cycle associated with the first vacuum evaporator stage is heated in two heat exchangers, which are connected in parallel and one of which is supplied with sulfuric acid from the end absorber, whereas the other heat exchanger is supplied with part of the sulfuric acid from the interstage absorber and the phosphoric acid in the phosphoric acid cycle associated with the second vacuum evaporator stage is heated by the remaining sulfuric acid from the interstage absorber. Each heat exchanger may comprise two or more units connected in parallel. In such an arrangement, the end absorber of the contact process sulfuric acid plant can be operated so that the acid withdrawn from it is at a lower temperature than the acid withdrawn from the interstage absorber and the distribution of heat to the various evaporator stages to the plant for concentrating phosphoric acid can be well controlled.

BRIEF DESCRIPTION OF DRAWINGS

The invention will be explained more in detail with reference to the drawings and to Examples.

DESCRIPTION OF SPECIFIC EMBODIMENTS

Figure 1:
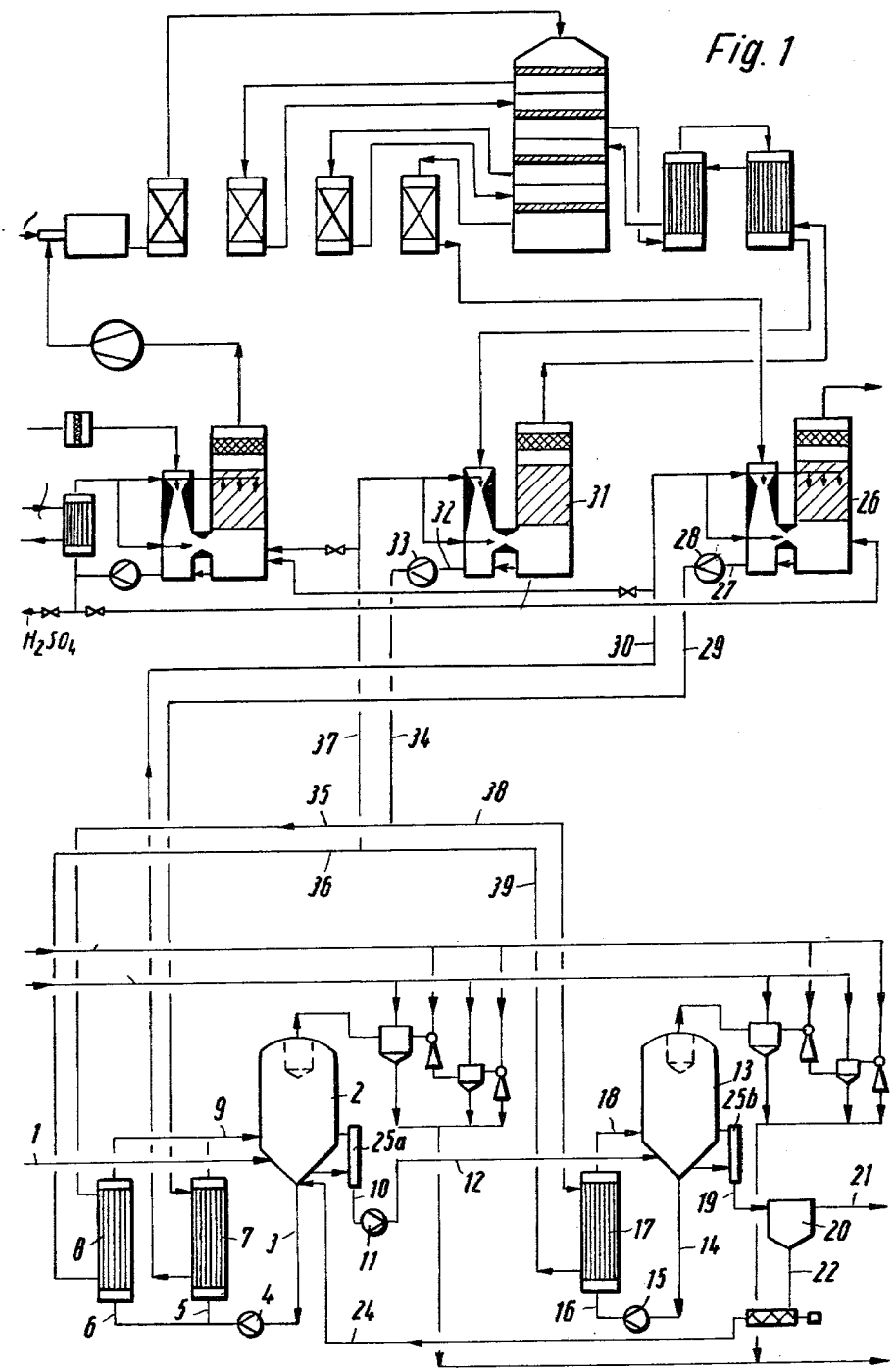
FIG. 1 is a flow scheme showing a contact process sulfuric acid plant and a plant for concentrating phosphoric acid in an arrangement in which sulfuric acid from the absorption systems is supplied direct to the heat exchangers of the phosphoric acid cycles.

In accordance with FIG. 1, dilute phosphoric acid is fed in conduit 1 to an evaporator 2 of a first vacuum evaporator stage. By means of a pump 4, phosphoric acid is withdrawn in conduit 3 from the evaporator 2 and fed in conduits 5, 6 to heat exchangers 7, 8 and is heated therein and then returned to the evaporator 2. Phosphoric acid at a $P_2O_5$ rate which is equal to the rate of $P_2O_5$ supplied in conduit 1 is fed by means of a pump 11 in conduits 10 and 12 to an evaporator 13 of a second vacuum evaporator stage. By means of a pump 15, phosphoric acid is withdrawn from the evaporator 13 in conduit 14 and is fed in conduit 16 to a heat exchanger 17 and is heated therein and then returned in conduit 18 to the evaporator 13. Concentrated phosphoric acid is conducted in conduit 19 to a settling tank 20. Product is withdrawn in conduit 21. Part of the solids-containing suspension which has settled is fed via conduit 22, screw pump 23 and conduit 24 to the evaporator 2 of the first vacuum evaporation stage. The discharge conduits 10 and 19 connected to the evaporators 2 and 13 are vented by vents 25a, 25b.

Hot sulfuric acid is supplied from an end absorber 26 via conduit 27, pump 28, and conduit 29 to the heat exchanger 7 and is returned in conduit 30 to the end absorber 26. Hot sulfuric acid is supplied from an interstage absorber 31 via conduit 32, pump 33 and conduits 34 and 35 to the heat exchanger 8 and is returned in conduits 36 and 37 to the interstage absorber 31. Part of the hot acid withdrawn from the interstage absorber 31 is fed in conduit 38 to the heat exchanger 17 and is returned in conduits 39 and 37 to the interstage absorber 31.

Figure 2:
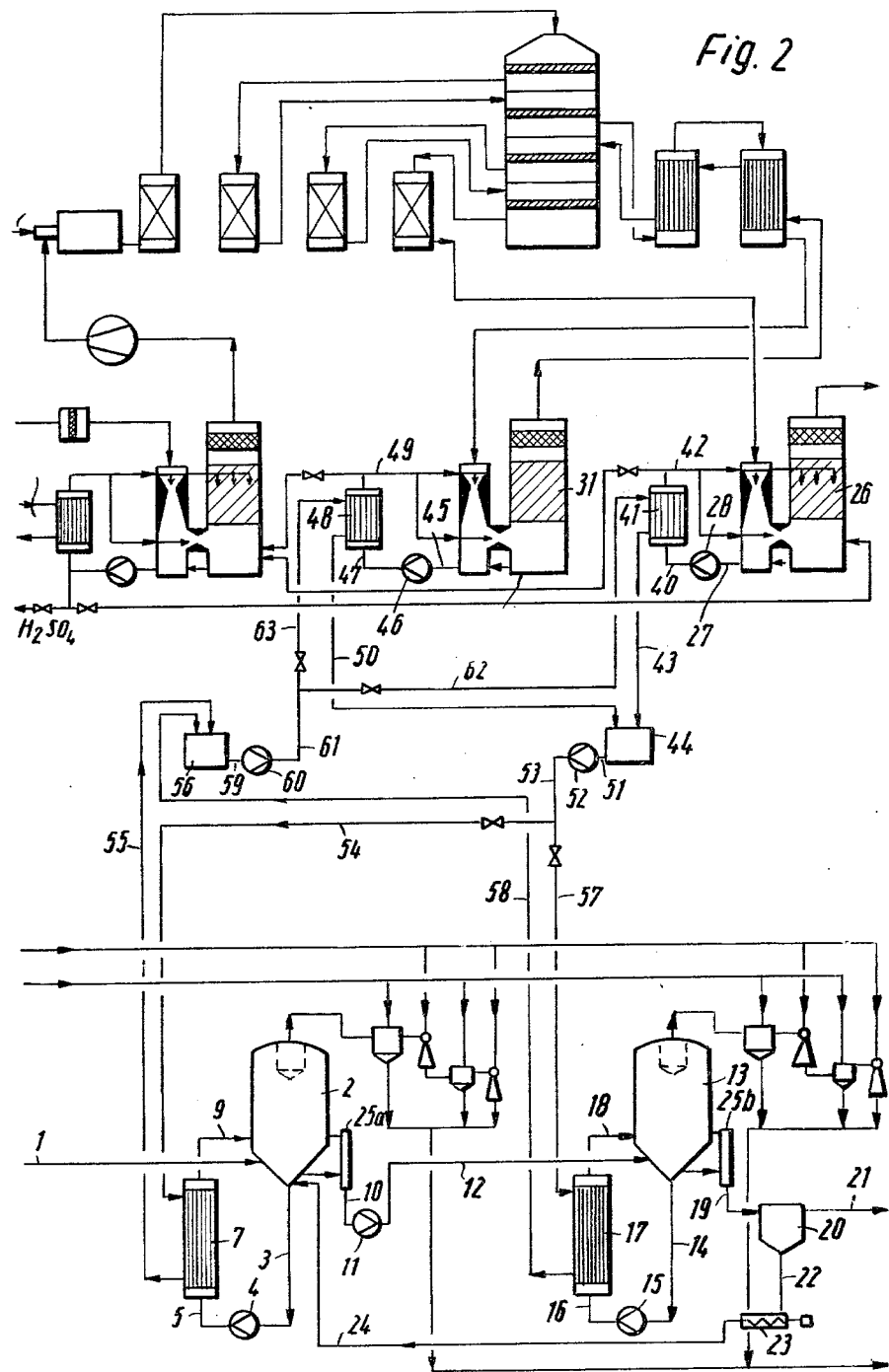
FIG. 2 is a flow scheme showing a contact process sulfuric acid plant and a plant for strengthening phosphoric acid in an arrangement in which sulfuric acid from the absorption systems heats a heat-carrying medium, which is then supplied to the heat exchangers of the phosphoric acid cycles.

In accordance with FIG. 2, phosphoric acid flows are as in FIG. 1 but there is only one heat exchanger 7 in the first vacuum evaporator stage.

Hot sulfuric acid is supplied from the end absorber 26 via conduit 27, pump 28 and conduit 40 to a heat exchanger 41 and is returned from the latter in conduit 42 to the end absorber. A heat-carrying liquid medium is heated in the heat exchanger 41 and is then supplied in conduit 43 to an intermediate container 44. Hot sulfuric acid is supplied from the interstage absorber 31 via conduit 45, pump 46 and conduit 47 to a heat exchanger 48 and is returned from the latter in conduit 49 to the interstage absorber 31. The heat-carrying liquid medium which has been heated in the heat exchanger 48 is supplied in conduit 50 to the intermediate container 44. A partial stream of the heat-carrying liquid medium is supplied from the intermediate container 44 via conduit 51, pump 52 and conduits 53 and 53 to the heat exchanger 7 and from the latter in conduit 55 to an intermediate container 56. The remaining stream of heat-carrying medium is supplied in conduit 58 to the intermediate container 56. A partial stream of the heat-carrying medium is returned from the intermediate container 56 via conduit 59, pump 60 and conduits 61 and 62 to the heat exchanger 41. The remaining partial stream of the heat-carrying medium from the intermediate container 56 is returned in conduit 63 to the heat exchanger 48.

In all cases, an additional heat exchanger for cooling or heating may be connected in the circuit for the sulfuric acid or the heat-carrying medium so that an overall heat balance can be maintained particularly when the combined plant is being started or shut down.

In order to more fully illustrate the invention, and the manner of practicing the same, the following examples are presented:

EXAMPLES

The phosphoric acid plant is combined with a plant for producing sulfuric acid at a rate of 1500 (metric) tons $H_2SO_4$ (100%) per day.

| REFERENCE NUMBER | PARAMETER | UNIT | FIG. 1 | FIG. 2 |
|---|---|---|---|---|
| 1 | Rate of fresh phosphoric acid | t/h | 81.1 | 81.1 |
|  | $P_2O_5$ concentration | % by weight | 28.0 | 28.0 |
| 2 | Vacuum | mbars | 240 | 240 |
| 3 | $P_2O_5$ concentration | % by weight | 42 | 42 |
|  | Solids content | % by weight | 4 |  |
|  | Acid rate | t/h | 8300 | 8300 |
|  | Acid temperature | °C. | 83 | 83 |
| 9 | Acid temperature | °C. | 86 | 86 |
| 12 | Phosphoric acid rate | t/h | 54 | 54 |
| 13 | Vacuum | mbars | 70 | 70 |
| 14 | $P_2O_5$ concentration | % by weight | 54 | 54 |
|  | Acid rate | t/h | 4300 | 4300 |
|  | Acid temperature | °C. | 83 | 83 |
| 18 | Acid temperature | °C. | 86 | 86 |
| 21 | Product discharge rate | t/h | 42 | 42 |
|  | $P_2O_5$ concentration | % by weight | 54 | 54 |
| 22 | Solids rate | t/h | 3 | 3 |
| 27 | Acid rate from absorber | t/h | 900 | 900 |
|  | $H_2SO_4$ concentration | % by weight | 98.5 | 98.5 |
|  | Acid temperature | °C. | 140 | 140 |
| 30, 42 | Acid temperature | °C. | 120 | 120 |
| 32, 45 | Acid rate | t/h | 2400 | 2400 |
|  | $H_2SO_4$ concentration | % by weight | 98.5 | 98.5 |
|  | Acid temperature | °C. | 140 | 140 |
| 37, 49 | Acid temperature | °C. | 120 | 120 |
| 35 | Acid rate | t/h | 1050 | — |
| 38 | Acid rate | t/h | 2250 | — |
| 51 | Pressure water rate | t/h | — | 1235 |
|  | Pressure water temperature | °C. | — | 120 |
| 54 | Pressure water rate | t/h | — | 845 |
| 57 | Pressure water rate | t/h | — | 390 |
| 59 | Pressure water temperature | °C. | — | 100 |

The main advantages afforded by the invention reside in that the energy required for concentrating, except for the energy required to generate the vacuum, can be recovered entirely from low-grade heat from the contact process sulfuric acid plant. At the same time it is no longer necessary to cool the sulfuric acid cycles of the absorption systems by means of cooling water or air so that the resulting thermal loading of the environment is avoided. Whereas low-grade thermal energy is used to a large extent, the expediture in equipment and the operating costs are not higher than where steam, e.g., is used as a heating medium. As regards the mutual dependence of the phosphoric acid-stengthening plant and the contact process sulfuric acid plant in operation, the process according to the invention does not suffer from the process in which steam generated in the contact process sulfuric acid plant is used as a heating medium.

What is claimed is:

1. In a process for concentrating dilute phosphoric acid in a phosphoric acid process characterized by a plurality of separate phosphoric acids cycles, wherein the phosphoric acid is concentrated in each cycle by a vacuum evaporator the improvement wherein the phosphoric acid in the phosphoric acid cycle is heated by indirect heat exchanger by heat released in the sulfuric acid of the absorption system of a sulfuric acid contact process, said sulfuric acid having a temperature of 80 to 200°C., said phosphoric acid in a phosphoric acid cycle associated with a first vacuum evaporator being indirectly heated in two heat exchangers which are connected in parallel, one of which is supplied with sulfuric acid from an end $SO_3$ absorber of said sulfuric acid contact process, the other of which is supplied with part of the sulfuric acid from the interstage absorber of said sulfuric acid contact process and the phosphoric acid in the phosphoric acid cycle associated with the second evaporator stage is heated by the remaining sulfuric acid from the interstage absorber.

2. A process according to claim 1 wherein said phosphoric acid is heated by indirect heat exchange with a heat-carrying liquid medium which is conducted in a closed cycle and heated by indirect heat exchange with sulfuric acid within an $SO_3$ absorber of a sulfuric acid contact process.

3. A process according to claim 2 wherein said absorber is an end absorber.

4. A process according to claim 2 wherein said absorber is an interstage absorber.

* * * * *